(12) United States Patent
Khayat et al.

(10) Patent No.: US 9,306,458 B2
(45) Date of Patent: Apr. 5, 2016

(54) ADAPTIVE BOOST DRIVER CHARGING CIRCUIT

(71) Applicant: Texas Instruments Incorporated, Dallas, TX (US)

(72) Inventors: Joseph Maurice Khayat, Bedford, NH (US); Ramanathan Ramani, Plano, TX (US); Michael G. Amaro, Naperville, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 102 days.

(21) Appl. No.: 14/318,307

(22) Filed: Jun. 27, 2014

(65) Prior Publication Data

US 2015/0311794 A1  Oct. 29, 2015

Related U.S. Application Data

(60) Provisional application No. 61/984,608, filed on Apr. 25, 2014.

(51) Int. Cl.
*H02M 3/158* (2006.01)

(52) U.S. Cl.
CPC ..................... *H02M 3/158* (2013.01)

(58) Field of Classification Search
CPC ............ H02M 3/1588; H02M 3/1584; H02M 2003/158
USPC ............................ 323/225, 271, 272, 350, 288
See application file for complete search history.

(56) References Cited

U.S. PATENT DOCUMENTS

| 8,138,731 B2 * | 3/2012 | Chen ................... H02M 3/1584 323/272 |
| 2008/0094861 A1 * | 4/2008 | Wang ................... H02M 3/156 363/21.11 |

(Continued)

OTHER PUBLICATIONS

K. Nishijima, et al., "Analysis of Double Step-Down Two-Phase Buck Converter for VRM", Twenty-Seventh International Telecommunications Conference, 2005, INTELEC 2005, Sep. 2005, Berlin, pp. 497-502.

*Primary Examiner* — Gary L Laxton
*Assistant Examiner* — Kyle J Moody
(74) *Attorney, Agent, or Firm* — John R. Pessetto; Frank D. Cimino

(57) ABSTRACT

A power circuit combination includes a series capacitor buck converter including a first half-bridge including a first high side power switch (HSA), first low side power switch (LSA) and a second half-bridge. A transfer capacitor (Ct) is connected in series with HSA and LSA, and between the first and second half-bridges. An adaptive HS driver circuit has an output coupled to a gate of HSA and includes a power supply circuit including a summing circuitry that dynamically outputs a variable power supply level ($V_{GX}$) based on a fixed voltage and a voltage across Ct, a buffer driver, and a boost capacitor ($C_A$) across the buffer driver. $V_{GX}$ is coupled to a positive terminal of $C_A$. The power supply circuit is configured so that as a voltage across Ct varies, $V_{GX}$ adjusts so that a voltage across $C_A$ is changed less than a change in voltage across Ct.

13 Claims, 3 Drawing Sheets

(56) References Cited

U.S. PATENT DOCUMENTS

| | | | | |
|---|---|---|---|---|
| 2009/0146618 A1* | 6/2009 | Adragna | G05F 1/70 | 323/205 |
| 2012/0313595 A1* | 12/2012 | Mao | H02M 3/1588 | 323/271 |
| 2014/0062446 A1* | 3/2014 | Ikriannikov | H02M 1/14 | 323/304 |
| 2015/0002115 A1* | 1/2015 | Shenoy | H02M 3/1584 | 323/271 |
| 2015/0077075 A1* | 3/2015 | Knoedgen | H02M 1/088 | 323/272 |
| 2015/0311792 A1* | 10/2015 | Amaro | H02M 3/158 | 323/271 |
| 2015/0311793 A1* | 10/2015 | Khayat | H02M 3/158 | 323/271 |

* cited by examiner

ADAPTIVE BOOST DRIVER CHARGING CIRCUIT

CROSS REFERENCE TO RELATED APPLICATIONS

This application claims the benefit of Provisional Application Ser. No. 61/984,608 entitled "Adaptive High Side Boost Driver Charging Circuit", filed Apr. 25, 2014, which is herein incorporated by reference in its entirety.

FIELD

Disclosed embodiments relate to drivers for power converters and power converter circuits therefrom.

BACKGROUND

Two-phase pulse width modulation (PWM) DC-DC buck converters use two output inductors, each carrying half the total load current being switched to operate at half the switching frequency. Using two inductors in the output stage also provides the ability to better distribute heat dissipation, which can be a significant problem with high-current output converter designs.

Multi-phase, interleaved, synchronous DC-DC buck converters are commonly used as point-of-load regulators which need low output voltages and handle fast dynamic load changes. These modular or embedded point-of-load converters, which are known as voltage regulators (VRs), generally regulate output voltages, often as low as 0.6V, which support highly dynamic and fast slew rate current loads. In a majority of applications these VRs are powered from a regulated 12 V input power supply.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize there is a challenge to establish a bootstrap supply circuit or often known as a "boost charging circuit", generally used for driving the gate of a high side n-channel MOSFET whereby its source potential varies with a switching signal in a particular converter topology referred to herein as a "series capacitor buck converter". The series capacitor buck converter comprises a first half-bridge circuit including a first high side power switch (HSA) and first low side power switch (LSA) connected in series having a first switching node (SWA) therebetween which drives a first output inductor, and a second half-bridge circuit including a second HS power switch (HSB) and second LS power switch (LSB) connected in series having a second switching node (SWB) therebetween which drives a second output inductor. A transfer capacitor (Ct) is connected in series with HSA and LSA, and between the first half-bridge circuit and second half-bridge circuit.

The challenge arises because the nodal voltage on Ct does not go to ground when LSA is ON, and instead varies as the input voltage to the converter (Vin) and other system parameters change. It is thus recognized that the boost charging circuit utilized for charging HSA in the first half-bridge circuit can benefit from an adaptive level shifted boost charging circuit that adapts the boost charge voltage as a function of the varying voltage on Ct.

Disclosed embodiments include a power circuit combination including a series capacitor buck converter and an adaptive boost driver circuit. The adaptive boost driver circuit (also referred to herein as a high side (HS) driver) includes a high side flying buffer driver (buffer driver) whose positive and negative power supply terminals are connected to the positive (+) terminal and reference (−) terminal of its bootstrap capacitor, $C_A$, respectively, and whose output is coupled to the gate of HSA to supply energy to charge and discharge the gate of HSA.

The voltage level of this buffer driver output is dynamically controlled to a variable power supply level referred to herein as $V_{GX}$ or a $V_{GX}$ voltage. The $V_{GX}$ voltage is coupled to the positive terminal of the bootstrap capacitor, $C_A$. As the voltage across Ct varies, $V_{GX}$ adjusts in order to maintain a relatively constant voltage, 5V for example, across $C_A$, so that a stable voltage is provided across the power supply terminals of the HS buffer driver for HSA. Accordingly, the buffer driver driving the gate of HSA will be provided a fixed safe operating voltage irrespective of the variation in the voltage at the high side terminal of Ct.

BRIEF DESCRIPTION OF THE DRAWINGS

Reference will now be made to the accompanying drawings, which are not necessarily drawn to scale, wherein.

DETAILED DESCRIPTION

Figure 1:
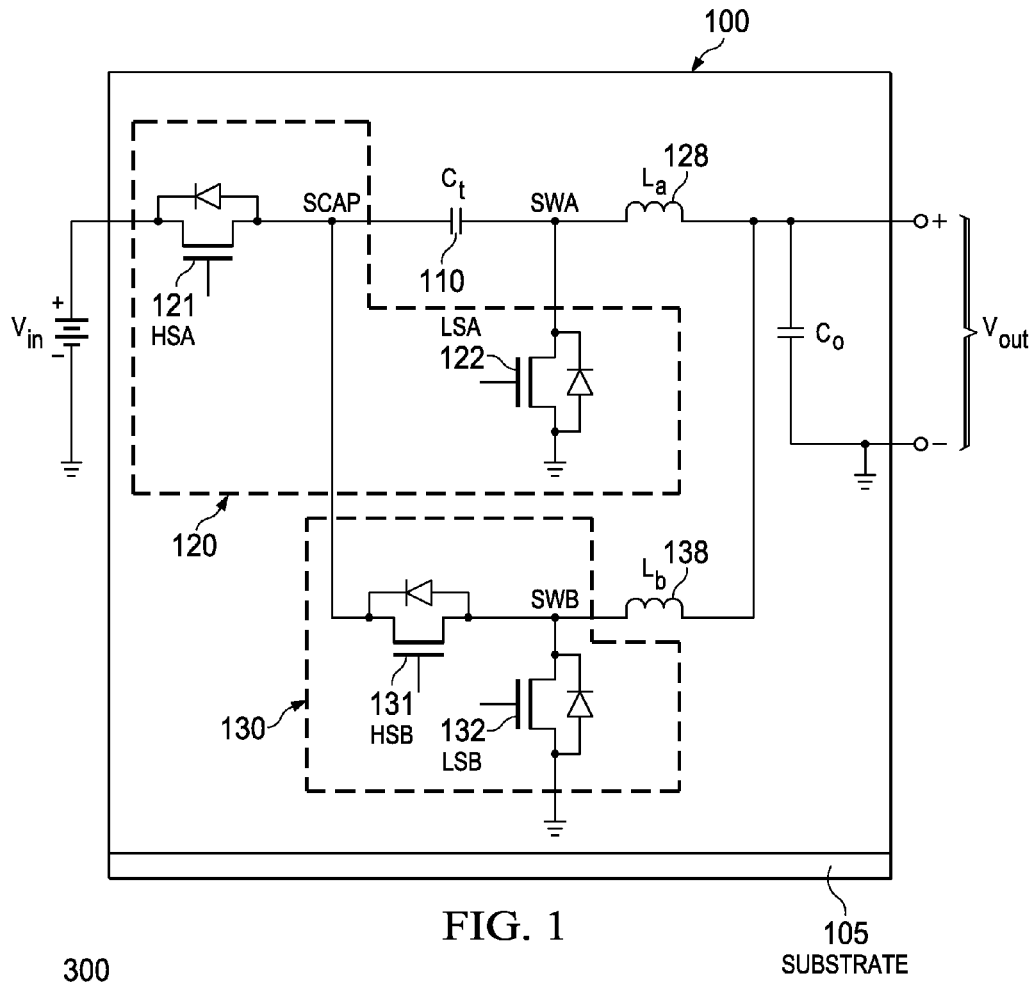
FIG. 1 is an example of a monolithic series capacitor buck converter that includes a Ct connected in series with HSA and LSA, and between the first half-bridge circuit and second half-bridge circuit.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

The series capacitor buck converter configuration described above includes a Ct between the first and second half-bridge circuits. FIG. 1 depicts an example monolithic series capacitor buck converter 100 that includes a Ct 110 in series with HSA 121 and LSA 122, and between the first half-bridge circuit 120 and second half-bridge circuit 130. A disclosed HS driver charging circuit can be used to drive HSA 121 in order to overcome the challenge that its source node, SCAP, does not switch between ground and $V_{in}$.

The series capacitor buck converter 100 is shown as a monolithic integrated circuit (IC) formed in and on a substrate 105, such as a silicon comprising substrate including bulk silicon or silicon epi on a bulk silicon substrate. The substrate 105 can also generally comprise other materials, such as elementary semiconductors besides silicon including germanium. Substrate 105 may also generally comprise a compound semiconductor such as silicon carbide, gallium arsenide, indium arsenide, or indium phosphide. Moreover, substrate 105 may also generally comprise an alloy semiconductor such as silicon germanium, silicon germanium carbide, gallium arsenic phosphide, and gallium indium phosphide. The gate driver circuitry and/or control logic can also be formed on the substrate 105 for driving the gates of the power switches in the respective half-bridges is not shown in FIG. 1 for simplicity to avoid obscuring inventive details.

During operation of the series capacitor buck converter 100, the series capacitor buck converter 100 receives an input DC voltage shown as Vin at only the drain of HSA 121. Using suitable gate drive signals from control logic and gate drivers (not shown in FIG. 1) typically being PWM signals, the first half-bridge circuit 120 is controlled to be switched to provide phase A and the second half-bridge circuit 130 to be switched at other times to provide phase B. Ct 110 is shown between the nodes identified in FIG. 1 as SCAP (series capacitor, its high side terminal) and SWA (its low side terminal).

Phase A provided by first half-bridge circuit 120 drives a first output inductor shown as La 128, and Phase B provided by the second half-bridge circuit 120 drives a second output inductor shown as Lb 138. La 128 and Lb 138 together drive an output node of the series capacitor buck converter 100 shown as Vout that is developed across the output capacitor (Co) shown and ground. In steady state operation the series capacitor buck converter 100 has each output inductor 128, 138 carrying one-half the total load current and operating at one-half the switching frequency provided by the series capacitor buck converter 100.

Both HSA 121 and LSA 122 are both shown as MOSFETs, with a SWA (switch A) node connected to Ct 110 and first output inductor 128. SWA is coupled to SCAP node via Ct 110. The second half-bridge circuit 130 includes HSB 131 and LSB 132 also shown as MOSFETs, with the SWB (Switch B) node in-between.

The power switches HSA 121, LSA 122, HSB 131 and LSB 132 are shown conventionally configured MOSFETs having their body diodes parallel to their source-to-drain path by shorting the source to the body of the MOSFET. As noted above, gate drivers for providing PWM signals for driving the gates of HSA 121, LSA 122, HSB 131 and LSB 132 are not shown in FIG. 1.

Ct 110 can be a monolithic capacitor integrated on the same substrate as the power switches (HSA 121, LSA 122, HSB 131, and LSB 132) in a technology that offers high density monolithic capacitors. A monolithic capacitor is defined in the art and defined herein to be a capacitor in which the layers of electrodes and dielectric(s) are bonded together in a unitary structure as opposed, for example, to a metallized film capacitor in which self-supporting films are rolled or wound into the capacitor form. The monolithic capacitor can comprise a multi-layer chip capacitor (sometimes labeled MLCCs), that are known to provide high density ceramic capacitors.

The second half-bridge circuit 130 in FIG. 1 providing Phase B is shown as a standard buck power stage. A conventional HS boost driver circuit which drives the gate of HSB 131 is generally referenced to the SWB (a common node) between HSB 131 and LSB 132.

Figure 2A:
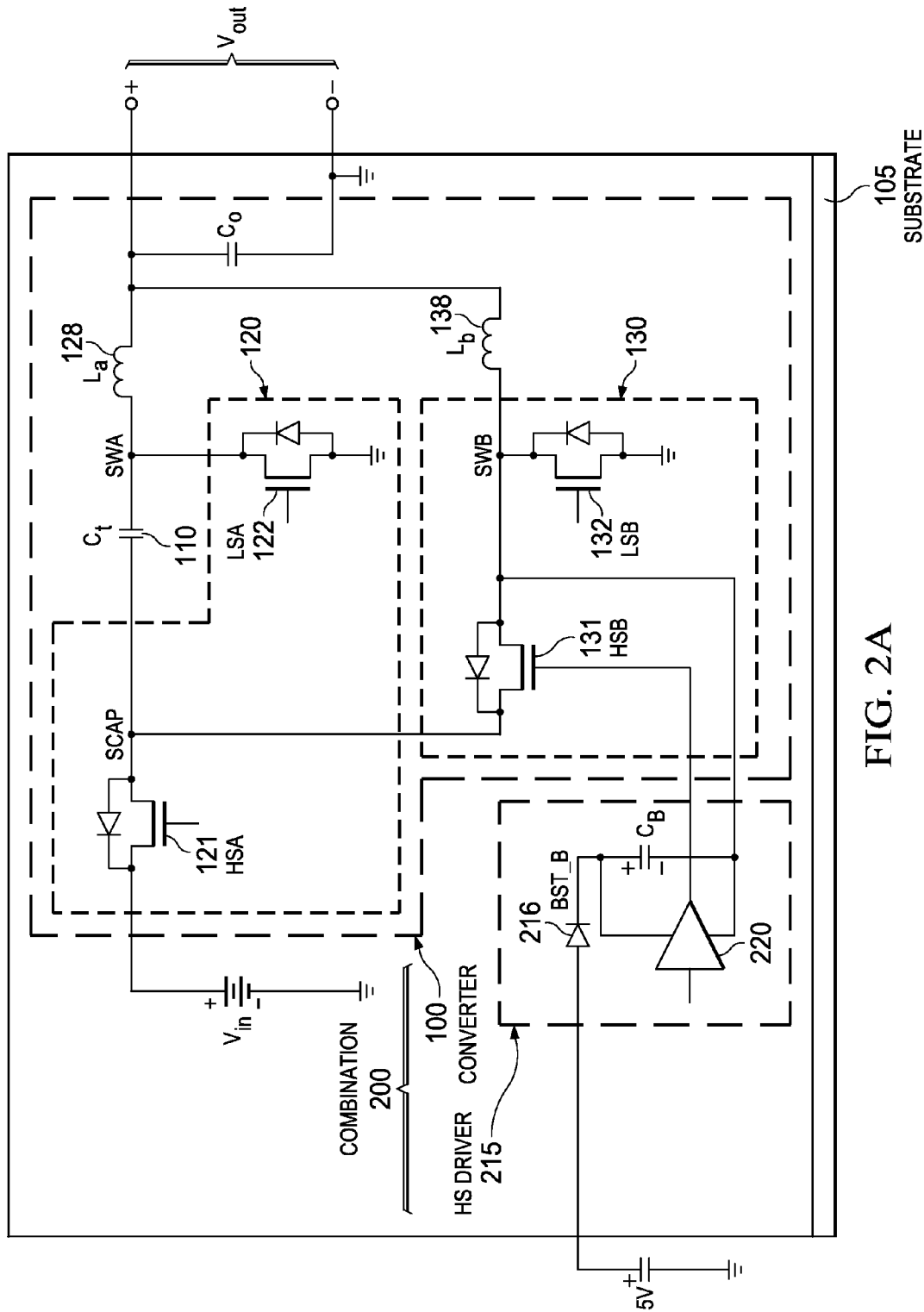
FIG. 2A shows a power circuit combination including the monolithic series capacitor buck converter shown in FIG. 1 together with a HS boost driver circuit that includes a flying boost capacitor ($C_B$) having a fixed boost voltage supply shown as 5V, according to an example embodiment.

FIG. 2A shows a power circuit combination 200 including the monolithic series capacitor buck converter 100 in FIG. 1 together with a HS driver circuit 215 all on or in a substrate 105, where the HS driver circuit 215 includes a flying boost capacitor shown as $C_B$, according to an example embodiment. $C_B$ is across the power supply terminals of flying buffer driver (buffer driver) 220. "Flying" refers to the reference terminal of $C_B$ connected to a node in the circuitry that can vary in potential, shown as SWB.

When the SWB node is close to ground level (when LSB 132 is ON), $C_B$ charges to the DC power supply level (shown as 5V) minus a forward diode drop from diode 216 (to the voltage at node BST_B). The power supply voltage across the buffer driver 220 that drives the gate of HSB 131 is thus safely established to be within the DC power supply level shown as 5V, where the positive power supply terminal of the buffer driver 220 is tied to BST_B and the negative power supply terminal of the buffer driver 220 is tied to SWB.

The first half-bridge circuit 120 providing Phase A, however, has its HS driver for driving HSA 121 referenced to Ct 110 instead of the common node between the HSA 121 and LSA 122 that would be present without Ct 110. The nodal voltage at SCAP when LSA 122 is ON does not go to ground, but instead is equal to ground plus the voltage across Ct 110, whereby this Ct voltage varies in value as Vin varies, since it is approximately one-half of Vin. The voltage across Ct 110 also varies as a function of other system parameters, such as mismatches in inductors 128 and 138, in order to maintain current balance between inductors 128 and 138.

It is thus recognized the HS driver circuit for driving the HSA 121 can benefit from an adaptive (or dynamic) gate charging circuit that changes the reference voltage for the boost charge as a function of the varying voltage across Ct 110 (SCAP-SWA), in order to maintain a constant voltage, such as 5V, across the bootstrap capacitor. That is, by adaptively changing the boost charge voltage as a function of the varying voltage across Ct 110, the power supply voltage across the buffer driver 220 will remain at a fixed voltage, such as 5V floating on top of the varying SCAP node voltage.

Figure 2B:
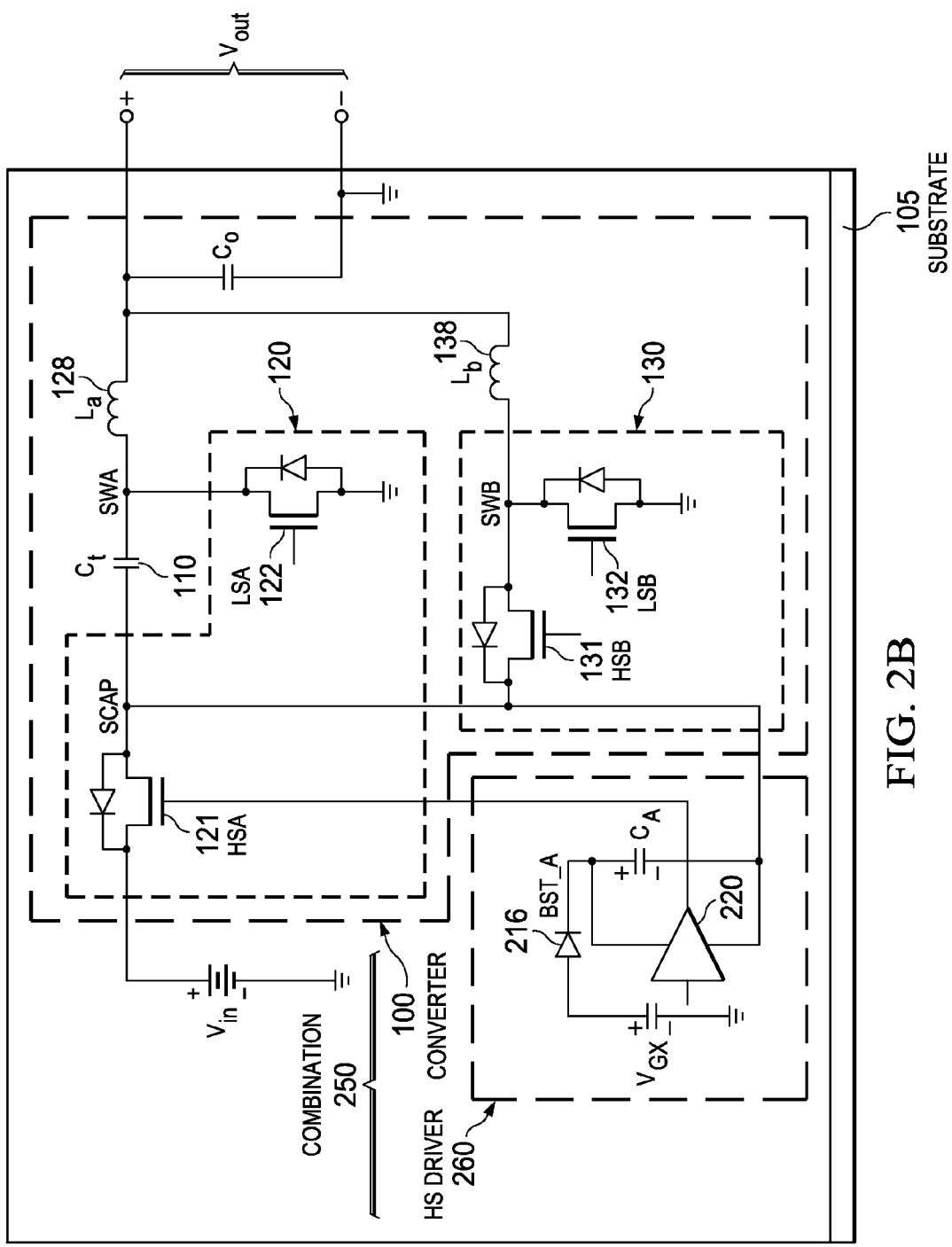
FIG. 2B shows an example power circuit combination including the monolithic series capacitor buck converter shown in FIG. 1 together with a disclosed HS boost driver circuit that includes $C_A$ having an example variable boost voltage supply circuit that utilizes a variable power supply level $V_{GX}$, according to an example embodiment.

FIG. 2B shows a power circuit combination 250 including the monolithic series capacitor buck converter 100 in FIG. 1 together with an example HS driver circuit 260 that utilizes a variable power supply level $V_{GX}$ for driving HSA 121, according to an example embodiment. The power circuit combination 250 is shown as a monolithic IC shown all in or on the substrate 105. The HS driver circuit 260 includes a buffer driver 220 having its positive supply terminal connected to node BST_A which is at the positive terminal of $C_A$, and its negative power supply terminal floating on node SCAP which is at the reference terminal of $C_A$.

Node SCAP is at the voltage across Ct 110 plus the SWA node voltage. Power circuit combination 250 recognizes that since the voltage across Ct 110 changes during operation of the series capacitor buck converter 100, this change can be compensated for by utilizing a variable power source shown providing $V_{GX}$ within the HS driver circuit 260 that represents a constant voltage (e.g., 5V) plus the variable voltage across Ct 110. The power supply voltage across buffer driver 220 is thus maintained at a constant voltage (e.g., 5V), so that despite voltage across Ct 110 varying, $C_A$ remains charged to a fixed voltage (e.g., 5V) since $V_{GX}$=the fixed voltage+the voltage across Ct 110 (SCAP-SWA). Accordingly, with HS driver circuit 260, the buffer driver 220 driving the HSA 121 of the first half-bridge circuit 120 providing Phase A for series capacitor buck converter 100 will be provided a fixed safe operating voltage irrespective of the variation in the voltage at SCAP.

Figure 3:
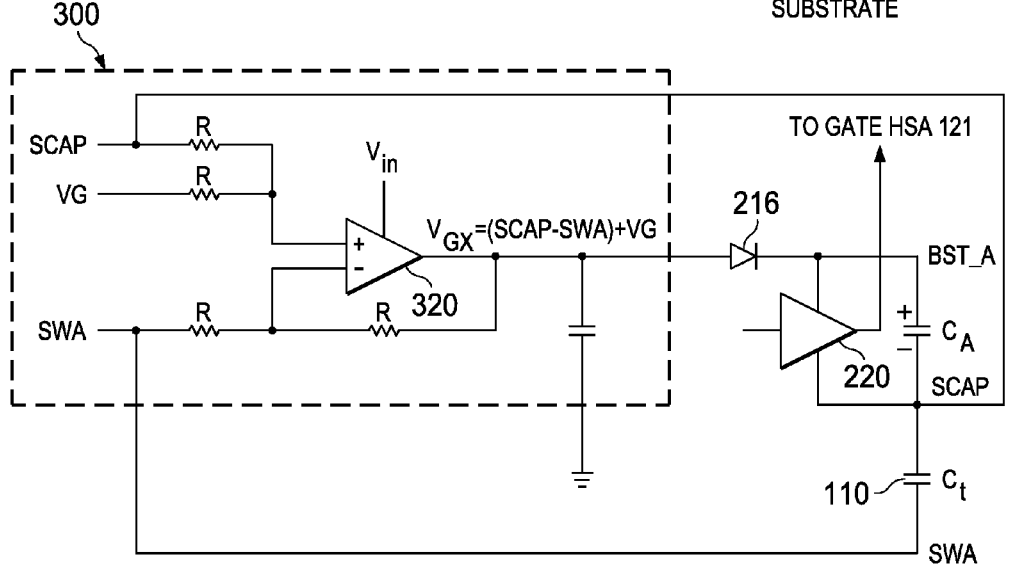
FIG. 3 is an example power supply circuit including summing circuitry shown as an operational amplifier configured for receiving a fixed voltage level, VG (5V for example), a first voltage level, SCAP, and a second voltage level, SWA, and outputting $V_{GX}$, according to an example embodiment.

FIG. 3 is an example power supply circuit 300 including summing circuitry shown as an operational amplifier 320 configured for receiving a fixed voltage level, and a first voltage level and a second voltage level and outputting $V_{GX}$, according to an example embodiment. Power supply circuit 300 can be integrated on a common substrate with monolithic series capacitor buck converter 100. Power supply circuit 300 dynamically outputs $V_{GX}$ from a received fixed voltage level shown as VG and a voltage difference shown as the voltage across Ct 110 of the series capacitor buck converter 100 (SCAP-SWA). Although the summing circuitry 320 is shown as an operation amplifier, other summing circuitry can also be used.

Advantages of disclosed embodiments include maintaining a safe operating voltage across the boot capacitor $C_A$ and the buffer driver 220. Disclosed embodiments also help maintain a safe operating voltage across the power switches in the monolithic series capacitor buck converter 100.

Disclosed embodiments can be used to form semiconductor die and semiconductor devices that may be integrated into a variety of assembly flows to form a variety of different devices and related products. The semiconductor die may include various elements therein and/or layers thereon, including barrier layers, dielectric layers, device structures, active elements and passive elements including source regions, drain regions, bit lines, bases, emitters, collectors, conductive lines, conductive vias, etc. Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A power circuit combination, comprising:
a series capacitor buck converter including:
a first half-bridge circuit including a first high side power switch (HSA) and a first low side power switch (LSA) connected in series having a first switching node (SWA) therebetween which drives a first output inductor;
a second half-bridge circuit including a second HS power switch (HSB) and a second LS power switch (LSB) connected in series having a second switching node (SWB) therebetween which drives a second output inductor;
a transfer capacitor (Ct) connected in series with said HSA and said LSA and between said first half-bridge circuit and said second half-bridge circuit; and
an adaptive HS driver circuit having an output coupled to a gate of said HSA and a boost driver circuit including:
a power supply circuit including summing circuitry configured for dynamically outputting a variable power supply level ($V_{GX}$) based on a received fixed voltage and a voltage across said Ct;
a buffer driver, and
a boost capacitor ($C_A$) connected across power supply terminals of said buffer driver;
wherein said $V_{GX}$ is coupled to a positive terminal of said $C_A$, and wherein said power supply circuit is configured so that as said voltage across said Ct varies, said $V_{GX}$ adjusts so that a voltage across said $C_A$ changes less than a change in said voltage across said Ct.

2. The power circuit combination of claim 1, wherein said summing circuitry is configured so that said voltage across said $C_A$ is forced to said fixed voltage independent of said voltage across said Ct.

3. The power circuit combination of claim 1, wherein said voltage across said Ct comprises a difference between a first voltage level and a second voltage level, wherein said summing circuitry comprises an operational amplifier having a non-inverting input receiving said fixed voltage and said first voltage level and an inverting input receiving said second voltage level.

4. The power circuit combination of claim 1, wherein a positive supply of said summing circuitry is coupled to a drain of said HSA to both receive an input (Vin) to said series capacitor buck converter.

5. The power circuit combination of claim 1, wherein said HSA, said LSA, said HSB, and said LSB all comprise n-channel Metal Oxide Semiconductor Field Effect Transistors (MOSFETs).

6. The power circuit combination of claim 1, further comprising a substrate, wherein said Ct is a monolithic capacitor formed in or on said substrate, and wherein said series capacitor buck converter is formed in and on said substrate.

7. A method of operating a power converter, comprising:
providing a series capacitor buck converter including a first half-bridge circuit having a first high side power switch (HSA) and a first low side power switch (LSA) connected in series, a second half-bridge circuit including a second HS power switch (HSB) and second LS power switch (LSB) connected in series, and a transfer capacitor (Ct) connected in series with said HSA and said LSA and between said first half-bridge circuit and said second half-bridge circuit;
providing an adaptive HS driver circuit having an output coupled to a gate of said HSA, said adaptive HS driver circuit including a power supply including summing circuitry configured for dynamically outputting a variable power supply level ($V_{GX}$) based on a fixed voltage and changeable voltage across said Ct, a buffer driver, and a boost capacitor ($C_A$) across power supply terminals of said buffer driver, said $V_{GX}$ coupled to a positive terminal of said $C_A$;
dynamically generating said $V_{GX}$ from a fixed voltage level and a voltage across said Ct, and
responsive to a change in said voltage across said Ct, controlling a voltage across said $C_A$ using said $V_{GX}$ so that said voltage across said $C_A$ is changed by a magnitude that is less than a magnitude of said change in said voltage across said Ct.

8. The method of claim 7, wherein said voltage across said $C_A$ is held at said fixed voltage independent of said voltage across said Ct.

9. The method of claim 7, wherein said voltage across said Ct comprises a difference between a first voltage level and a second voltage level, and said dynamically generating said $V_{GX}$ comprises using said summing circuitry for receiving said fixed voltage and said first voltage level and an inverting input for receiving said second voltage level.

10. The method of claim 9, wherein said summing circuitry comprises an operational amplifier having a non-inverting input and said inverting input, wherein said non-inverting input receives said fixed voltage and said first voltage level, and said inverting input receives said second voltage level.

11. The method of claim 9, wherein a positive supply of said summing circuitry is coupled to a drain of said HSA to both receive an input (Vin) to said series capacitor buck converter.

12. The method of claim 9, wherein said HSA, said LSA, said HSA, and said LSB all comprise n-channel Metal Oxide Semiconductor Field Effect Transistors (MOSFETs).

13. A power circuit combination, comprising:
a series capacitor buck converter including:
a first half-bridge circuit including a first high side power switch (HSA) and a first low side power switch (LSA) connected in series having a first switching node (SWA) therebetween which drives a first output inductor;
a second half-bridge circuit including a second HS power switch (HSB) and a second LS power switch (LSB) connected in series having a second switching node (SWB) therebetween which drives a second output inductor;
a transfer capacitor (Ct) connected in series with said HSA and said LSA and between said first half-bridge circuit and said second half-bridge circuit; and
an adaptive HS driver circuit having an output coupled to a gate of said HSA, said HS driver circuit including:
a power supply circuit including summing circuitry configured for dynamically outputting a variable power supply level ($V_{GX}$) based on a received fixed voltage and a voltage across said Ct;
a buffer driver, and
a boost capacitor ($C_A$) connected across power supply terminals of said buffer driver;
wherein said $V_{GX}$ is coupled to a positive terminal of said $C_A$, and wherein said power supply circuit is configured so that as said voltage across said Ct varies, said $V_{GX}$ adjusts so that a voltage across said $C_A$ changes less than a change in said voltage across said Ct, and
wherein said summing circuitry is configured so that said voltage across said $C_A$ is forced to a fixed voltage level independent of said voltage across said Ct.

* * * * *